Aug. 13, 1929.  G. D. HAUSER  1,724,198
ELECTRIC HEATER
Filed June 30, 1927
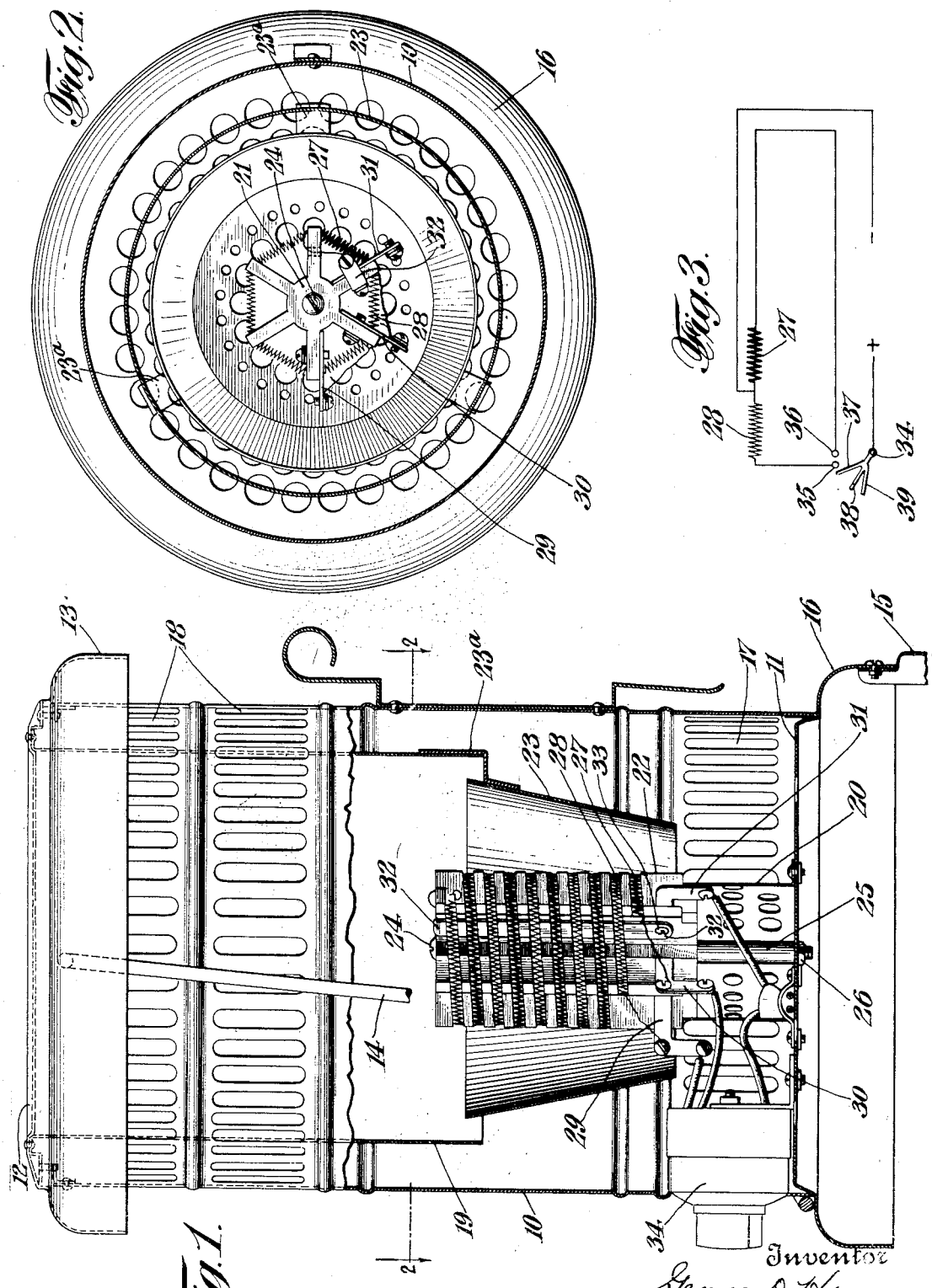
Inventor
George D. Hauser
By his Attorneys
Kenyon & Kenyon Patented Aug. 13, 1929.

1,724,198

UNITED STATES PATENT OFFICE.

GEORGE D. HAUSER, OF UTICA, NEW YORK, ASSIGNOR TO UTICA PRODUCTS, INC., OF NEW YORK, N. Y., A CORPORATION OF NEW YORK.

ELECTRIC HEATER.

Application filed June 30, 1927. Serial No. 202,483.

This invention relates to heaters and has for an object an improved portable electric furnace or stove.

The invention is preferably embodied in a stove comprising a cylindrical shell having apertures near its top and bottom edges and within which is provided an inner shell. A heating element is supported upon the upper edge of a flue and its upper end extends beyond the lower edge of the inner shell. An inverted conical reflector surrounds the heating element and is supported by the shell. The heating element, which is substantially cylindrical, consists of a support of insulating material having radial wings, at the edges of which are provided notches. A pair of resistance units are helically wound in the notches with their turns alternating. This permits the air to be heated to come in contact with substantially the entire surface of the heating elements. The two units are designed to develop different amounts of heat and are connected in parallel with a suitable switch by means of which either or both may be connected to a source of electrical energy, thus permitting the amount of heat generated by the stove to be varied at will.

Other objects, novel features and advantages of this invention will be apparent from the following specification and accompanying drawings wherein.

Figure 1 is a side elevation, partially in section, of a heater embodying the invention;

Fig. 2 is a section on the lines 2—2 of Fig. 1; and

Fig. 3 is a wiring diagram of the heater. 10 designates the body of the heater which comprises a cylindrical shell, the lower end of which is closed by a perforated bottom plate 11 and the upper end of which is closed by an apertured cover 12 having a depending flange 13 spaced from the shell 10. A bale 14 is pivotally connected to the shell 10 near its upper edge; and, legs 15 (broken off) attached to a flange 16 integral with the bottom plate 11 support the heater. Apertures 17 are provided in the shell 10 near its lower edge and corresponding apertures 18 are provided in the shell near its upper edge.

An inner shell 19 is attached at its upper end to the cover 12 and is coaxial with the shell 10. A perforated cylindrical flue 20 is mounted on the bottom plate 11 and supports an insulating member 21 having a plurality of radially extending wings 22. A tapering upwardly diverging reflector 23 surrounds the member 21 and is supported from the shell 19 by straps 23a. The lower edge of the reflector is approximately even with the upper edge of the flue 20 and the upper edge of the reflector extends a short way beyond the lower edge of the shell 19.

The effective diameter of the member 21 is somewhat greater than that of the flue 20 and the lower edges of the wings 22 are cut back to provide a reduced portion extending into the flue and shoulders resting upon its upper edge. The member 21 is held in place by a bolt 24 extending through said member, a spacing sleeve 25 and an aperture in the bottom plate 11, a nut 26 being provided on the bolt below the bottom plate. Helically-positioned notches are provided in the edges of the wings 22 and in the notches are arranged resistance units 27 and 28. Preferably, the resistance units 27 and 28 are wire helices and are arranged in alternate notches. The design of the resistance units is such that the unit 27 will develop more heat than will the element 28. Contact members 29, 30 and 31 are suitably mounted on wings 22. One end of the heating element 28 is connected to the contact member 29, and one end of the heating element 27 is connected to the contact member 30. A bus bar 32 extends along one rib from top to bottom and is connected with the contact member 31 by means of a bolt 33. The remaining ends of the heating elements 27 and 28 are connected to the upper end of the bar 32.

A switch 34 is connected suitably with the contacts 29, 30 and 31 and also with a lamp cord or the like (not shown) for connecting the stove with the house-lighting system. The switch 34 is so designed that the heating elements 27 and 28 may be individually or simultaneously energized. As such switches are well known and are not part of this invention, the structural details thereof are not disclosed.

Air is drawn in through the apertures in the flue, passed upwardly through the channels defined by the ribs 22 and contacts with the inner parts of the resistance elements 27 and 28. Also air passes upwardly between the reflector 23 and the heating unit, the air coming in contact with the outer portions of the resistance elements. The heated air passes through the inner shell 19 and is discharged through apertures in the top of the heater. When a low heat is desired, only the resistance element 28 is energized. For a medium heat, the element 27 only is energized. The maximum heat is obtained by energizing both the heating elements simultaneously.

Figure 3 discloses diagrammatically the circuits in their relation to the switch 34. In the position shown, the switch is off. In its first position, the arm 37 engages the contact 35, thus energizing the element 28. In its second position, the arm 37 engages the contact 36, thus energizing the element 27. In its third position, the arm 38 engages the contact 36 and the arm 39 engages the contact 35, thus energizing both elements 27 and 28. By virtue of the alternate arrangement of the turns of the elements 27 and 28, the heating unit is concentrated within a small space, and when both heating elements are energized the heating effect is more efficient and uniform than if the coils were not so arranged.

It is understood, of course, that various modifications may be made in the structural details without in any way departing from the spirit of the invention as defined in the appended claims.

I claim:

1. In a portable electric heater, a shell, a heating unit, a tapering reflector surrounding said unit, said reflector being supported by said shell and means independent of said reflector for supporting said heating unit.

2. In a portable electric heater, a shell, a flue, a heating unit supported on said flue, and a tapered reflector surrounding said unit, said reflector being supported by said shell.

3. In a portable electric heater, a shell, a flue, a heating unit supported on said flue, and a tapered reflector surrounding said unit, said reflector extending from the upper edge of said flue beyond the lower edge of said shell and being supported thereby.

4. In a portable electric heater, a flue, an insulating member having wings engaging the upper edge of said flue, and a heating element helically wound around the edges of said wings.

5. In a portable electric heater, a shell, an insulating member having wings, a heating unit helically wound around the edges of said wings, and a tapered reflector surrounding said unit, said reflector being supported by said shell.

6. A portable electric heater comprising a cylindrical shell having a bottom, a flue supported by said bottom, an insulating member resting on the upper edge of said flue, a bolt extending through said insulating member and fastened to said bottom, and a heating unit mounted on said insulating member.

7. In an electric heater, a vertically arranged flue, an insulating member having radially arranged vertical wings resting upon the upper edge of said flue, and a heating unit helically wound about the edges of said wings.

8. In an electric heater, an insulating member, a pair of resistance elements alternately wound on said member, and means for individually or simultaneously energizing said elements.

9. In an electric heater, an insulating member having radially extending longitudinal wings, a plurality of resistance elements alternately wound helically thereon, and means for energizing said resistance elements either individually or simultaneously.

10. A portable electric heater comprising an outer shell, an inner shell concentric therewith, a heating unit and a tapering reflector surrounding said heating unit, said reflector being supported by said inner shell.

11. A portable electric heater comprising an outer shell, an inner shell concentric therewith, a flue, a heating unit supported on said flue and a tapered reflector surrounding said unit and supported by said inner shell.

12. A portable electric heater comprising a cylindrical casing, a shell supported within said casing, a flue, a heating unit supported on said flue and a tapered reflector surrounding said heating unit, said reflector extending from the upper edge of said flue beyond the lower edge of said shell and being supported thereby.

13. In a portable electric heater, a flue, an insulating member having wings supported upon the upper edge of said flue and a heating element helically wound around the edges of said wings.

14. In a portable electric heater, a flue, an insulating member having wings supported upon the upper edge of said flue, a pair of resistance elements alternately wound on said member and means for individually or simultaneously energizing said elements.

15. A portable electric heater comprising a casing, a shell supported within said casing, a flue, an insulating member having wings supported upon the upper edge of said flue, a tapered reflector surrounding said unit and supported from said shell, a pair of resistance elements wound around said insulating member and means for energizing said resistance elements either individually or collectively.

16. A portable electric heater comprising a casing, a shell supported within said casing, a flue, an insulating member having wings supported upon the upper edge of said flue, a tapered reflector surrounding said unit and supported from said shell, a pair of resistance elements alternately wound helically on said insulating member and means for energizing said resistance elements either individually or collectively.

In testimony whereof, I have signed my name to this specification.

GEORGE D. HAUSER.